No. 718,376. PATENTED JAN. 13, 1903.
H. O'REILLY.
BEARING FOR SHAFTS AND AXLES.
APPLICATION FILED FEB. 20, 1902.
NO MODEL.

WITNESSES:
William Miller
Chas. E. Krueger

INVENTOR
Henry O'Reilly
BY
W. C. Hauff
ATTORNEY

UNITED STATES PATENT OFFICE.

HENRY O'REILLY, OF DUBLIN, IRELAND.

BEARING FOR SHAFTS AND AXLES.

SPECIFICATION forming part of Letters Patent No. 718,376, dated January 13, 1903.

Application filed February 20, 1902. Serial No. 94,947. (No model.)

*To all whom it may concern:*

Be it known that I, HENRY O'REILLY, a subject of the King of Great Britain and Ireland, residing at Dublin, Ireland, have invented Improvements in Bearings for Shafts and Axles, (for which I have obtained a British patent, No. 15,649, dated August 2, 1901,) of which the following is a specification.

This invention relates to certain new and useful improvements in bearings for shafts and axles; and the object thereof is to provide means for securing the easy running of the balls in their bearings or races and for readily locking the bearings to the shafts or axles.

The invention resides in the novel features of construction set forth in the following specification and claims, and illustrated in the annexed drawings, in which—

Figure 1:
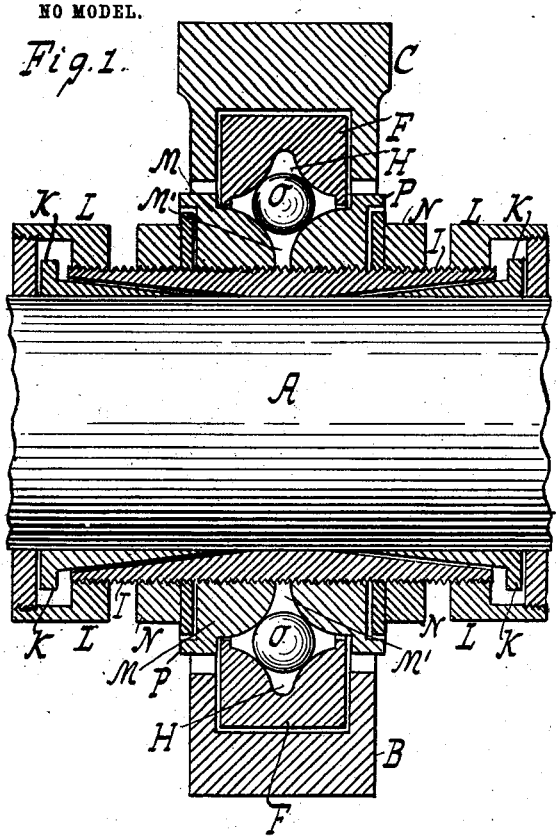
Figure 2:
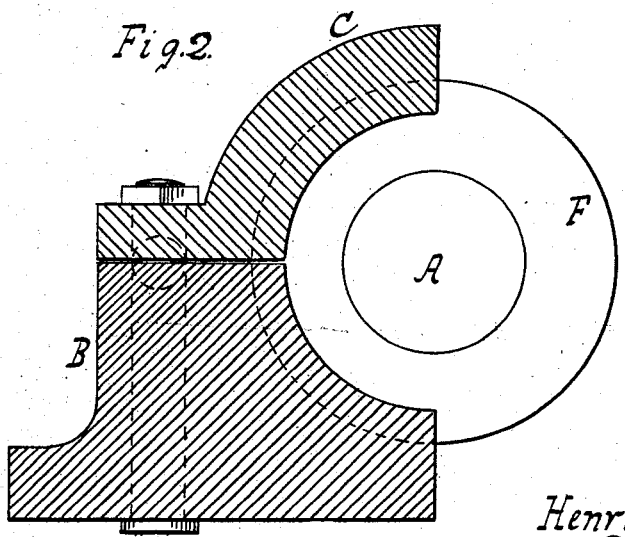

Figure 1 shows part of a shaft with my improved bearing in section. Fig. 2 is a detail sectional view of a pillow-block.

In the drawings, Fig. 1, the letter A indicates a shaft, and B a pillow-block, which can have a top or removable cap C. The block B is shown supporting a collar F, of steel or suitable material and shape, having interior convex faces forming a section or part H of a ball-race. The other side or section M' of the ball-race is formed by convex faces on rings M, suitably tapped or threaded to be screwed onto the threaded sleeve I. Locknuts N can be provided for these ball-race rings M, and the latter have flanges P, into which said nuts N or the washers of said nuts can be screwed or pressed. These flanges P overlap the inner edges of collar F. On the sleeve I are also screwed the nuts L, and about the shaft A sit the wedge-rings K. The ends of the sleeve are tapered to receive the wedges K, and as the nuts are tightened the wedges are clamped upon the shaft into the tapers or end portions of the sleeve.

The sleeve and wedge rings normally fit or, at least, can fit loosely about the shaft and the latter may vary more or less in diameter. When, however, the sleeve has been slipped onto the shaft and the wedges K suitably forced or driven home, the sleeve is locked or secured to the shaft or axle. In other words, the sleeve and shaft now rotate together.

A reversal or unscrewing of nuts L will free the wedges K to allow loosening or withdrawal of the same and of the sleeve.

The sleeve I and wedges K, clamping the shaft A, thus connect the ball-race section M to the shaft, and said sleeve and wedges can also serve for coupling two shafts or shaft ends or for connecting or temporarily repairing a break in the shaft.

The walls of the ball-race, it is noted, all present a convex bearing-face to the balls O. Easy running of the balls is thus secured, and by setting or screwing together the rings M more or less the balls can be raised or adjusted with great nicety and without jamming, such as has been found to occur in the case of V-shaped races.

My invention is not limited to the means shown and described for securing the sleeve to the shaft or axles, as any desired construction or devices may be employed for this purpose. In assembling these parts one of the cone-rings M is first screwed onto the sleeve I, the latter being then passed through the opening in the collar F. The balls are then placed in position, after which the other cone-ring is screwed up, and the said cone-rings are both locked in position by the nuts N. The sleeve I, with the parts thus connected therewith, is then, with the union-nuts L, passed over the shaft A, placed in the slot formed in the pillow-block, and the cylindrical wedges K, which are formed whole or in part, are then inserted into position in the opposite ends of the sleeve I, after which the union-nuts L are screwed onto the sleeves, so as to securely hold said wedges. It will be apparent, however, that the parts may be otherwise assembled, and my invention is not limited to the exact operation above described.

Having thus fully described my invention, what I claim as new, and desire to secure by Letters Patent, is—

1. A shaft, a screw-threaded sleeve mounted upon the shaft, inner rings mounted upon said sleeve, a wedge interposed between said sleeve and shaft adapted to connect the sleeve to the shaft, means mounted upon the sleeve for clamping the wedge in position, an outer ring, said rings forming a ball-race, a support or pillow-block for the outer ring, and balls interposed between said inner and outer rings.

2. A shaft, a sleeve mounted thereon, means interposed between the sleeve and shaft for connecting the former to the latter, means forming an inner ball-race mounted upon said sleeve, balls mounted in said race, and means mounted upon said balls and forming an outer race therefor.

3. A shaft, a sleeve mounted thereon, means interposed between said sleeve and shaft for connecting the former to the latter, ball-race rings mounted upon said sleeve, means connected to said sleeve to prevent lateral movement of said rings and outer race-rings, and balls interposed between said rings.

4. The combination with a shaft or axle, of a screw-threaded sleeve mounted thereon, cylindrical wedges and connections for locking said sleeve to the shaft, cone-rings connected with said sleeve, lock-nuts for holding said cone-rings in position, a collar inclosing said cone-rings and forming connections therewith, and a ball-race with balls placed in the said race, substantially as shown and described.

5. The combination with a shaft or axle, of cone-rings, a sleeve mounted upon the shaft for supporting the rings, cylindrical wedges interposed between said sleeve and shaft for connecting the former to the latter, union-nuts engaging the edges of said wedges for clamping them in position, lock-nuts for holding said cone-rings in position, a collar inclosing said rings and forming connections therewith, a ball-race and balls arranged in said race, substantially as shown and described.

In testimony whereof I have hereunto set my hand in the presence of two subscribing witnesses.

HENRY O'REILLY.

Witnesses:
EMILY O'REILLY,
ARTHUR DONN PIATT.